United States Patent

[11] 3,613,978

| [72] | Inventor | Walter Renold<br>7044 Mary Ellen Ave., North Hollywood,<br>Calif. 91605 |
|---|---|---|
| [21] | Appl. No. | 864,350 |
| [22] | Filed | Oct. 7, 1969 |
| [45] | Patented | Oct. 19, 1971 |

[54] APPARATUS FOR INTERMITTENTLY MOVING FILM
3 Claims, 8 Drawing Figs.

[52] U.S. Cl. .................................................. 226/117,
226/122
[51] Int. Cl. ..................................................... G03b 1/24
[50] Field of Search ........................................... 226/113,
114, 117, 115, 122; 352/159

[56] References Cited
UNITED STATES PATENTS

| 704,449 | 7/1902 | Edwards ...................... | 226/113 |
| 1,905,446 | 4/1933 | Dewey et al. ................. | 226/113 X |
| 2,998,748 | 9/1961 | Dessilani ..................... | 226/113 X |
| 3,201,798 | 8/1965 | Mayer, Jr. et al. ............ | 226/113 X |

*Primary Examiner*—Allen N. Knowles
*Attorney*—Pastoriza & Kelly

ABSTRACT: An apparatus for intermittently moving film through a film gate for purposes of either exposure or projection particularly suitable for high-speed motion picture cameras, utilizes first and second roller arrangements on either side of the film gate in place of the conventional film loops. These rollers are caused to oscillate sinusoidally in such a manner as to increase the path length of film moving into the film gate and simultaneously decrease the path length of film leaving the film gate and thence reverse this motion to decrease the path length of film fed into the film gate and simultaneously increase the path length film leaving the film gate. With this arrangement the film may be payed out and taken up at constant speed while intermittent movement of film in the gate takes place and further the film is always captured. By properly adjusting the oscillation speed of the rollers relative to the payout and takeup constant speed, a portion of the film in the gate is stationary during a period when the path length of film into the film gate is increasing and the path length of film from the film gate is decreasing, and moving at a speed substantially twice the constant payout and takeup speed during another period when the path length of film into the film gate is decreasing and the path length of film from the film gate is increasing. Pulldown claw arrangements are thus eliminated as well as free-type storage loops heretofore used and the instability problems associated with such loops when the camera or projector is operating at high speed.

PATENTED OCT 19 1971

INVENTOR.
WALTER RENOLD
BY
Pastoriza & Kelly
Attorneys

INVENTOR.
WALTER RENOLD
BY
Attorneys

APPARATUS FOR INTERMITTENTLY MOVING FILM

This invention relates generally to film-moving apparatus and more particularly to a novel apparatus for intermittently moving film through a film gate particularly useful in high-speed motion picture cameras or projectors.

BACKGROUND OF THE INVENTION

Intermittent film movement in motion picture cameras and projectors is normally effected by means of a pulldown claw or intermittent sprocket which periodically engage perforations in the film to pull down the film one frame at a time through the film gate. Normally the film is fed towards the film gate from sprocket wheel which is driven at a constant speed and taken up from the film gate by a second sprocket wheel, or, in some instances, the same sprocket wheel at the same speed. Constant film speed movement is important in instances wherein a soundtrack is being recorded or being reproduced from the film.

Because of the constant payout and takeup speeds, in order to realize the desired intermittent film movement in the film gate, it is necessary to form storage loops close to the entrance and exit portions of the film gate. The loop at the entrance portion, for example, will increase in size while a frame is being exposed or projected in the film gate, the loop at the exit portion of the film gate decreasing in size during this period. When the pulldown claw positions the next frame, the film loop at the entrance of the film gate is decreased and film loop at the exit of the film gate is increased.

One of the major causes of film wear is the action of the pulldown claw in mechanisms of the foregoing type. As a consequence, it has been proposed to feed the film intermittently by suitable rollers rather than pulldown claws. On the other hand, there is still the problem of forming proper loops of free film for the aforementioned storage purposes. When a camera or projector is operated at relatively high speeds under these conditions, it is found that these free storage loops tend to vibrate or become unstable and flutter. Further, when moved by rollers in the absence of any mechanism for stopping the film, the free loops permit coasting movement of the film because of its own inertia. As a consequence, registration of successive frames by roller means for pulling down the film is difficult to achieve.

Elimination of the free loops has been previously effected by keeping the loops always in tension by resilient means. However, the natural frequency of such means cannot be made high enough to follow the film at higher speeds.

BRIEF DESCRIPTION OF THE PRESENT INVENTION

With the foregoing in mind, the present invention contemplates the provision of a unique apparatus for intermittently moving film through a film gate wherein problems heretofore encountered with storage loops are wholly eliminated.

More particularly, in place of storage loops, the apparatus of the invention includes a first means, preferably in the form of rollers defining a first path for guiding film from a constant payout film means to the film gate, and a second means preferably in the form of rollers defining a second path for guiding film from the film gate to a constant speed operated takeup means. The film at all times is unyieldingly captured by the rollers. The apparatus is completed by a control means coupled to the rollers for periodically increasing and decreasing the length of the first path by equal amounts and simultaneously periodically decreasing and increasing the length of the second path by equal amounts corresponding to the first-mentioned equal amounts. The sum of the path lengths is thus always constant. The speed of the film through the film gate at a portion of the time when the first path is increasing in length and the second path is decreasing in length is substantially zero and the speed of the film through the film gate at a portion of the time when the first path is decreasing in length and the second path is increasing in length is substantially twice the constant payout and takeup speed.

In the preferred embodiments of the invention, the motion of the rollers is defined by a sinusoidal oscillation generally in a direction towards and away from a straight line extending from the payout and takeup means to the film gate, this line passing between the first rollers feeding film into the film gate and second rollers receiving film from the film gate. Movement of the rollers away from this line will thus increase the path in question whereas movement of the rollers toward the line decreases the path length.

A particular embodiment of the invention utilizes a first pair of rollers for varying the first path length and a second pair of rollers for varying the second path length. One of the rollers in one pair oscillates in phase with one of the rollers in the other pair and the other roller in the one pair oscillates in phase with the other roller in the other pair but 90° out of phase with the first-mentioned rollers. The sum of these oscillatory motions results in a substantially constant increasing or decreasing of the path length during certain periods together with a smooth reversal of roller movement so that minimum wear is experienced by the film and accurate picture registration is possible even under very high speeds.

BRIEF DESCRIPTION OF THE DRAWINGS

A better understanding of the invention will be had by now referring to the accompanying drawings, in which.

DETAILED DESCRIPTION OF THE INVENTION

Figure 1:
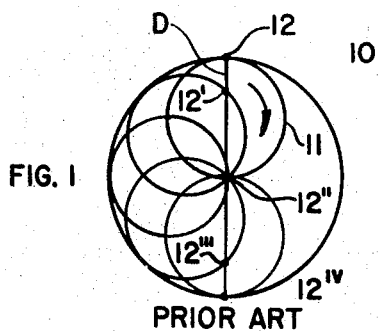
FIG. 1 is a simple geometrical schematic diagram useful in explaining the operation of one type of control means for the apparatus of the invention.

Referring first to FIG. 1, there is shown a large circle 10 tangentially engaged by a smaller circle 11 of one-half the diameter of the circle 10 If the circle 11 is permitted to roll around the inside of the circle 10, the point 12 of tangency on its periphery will assume successive positions such as indicated at 12′ 12″ 12‴ and 12′ᵛ. The foregoing locus of the point 12 for movement of the inner circle 11 through 180° defines a line D corresponding to a diameter of the larger circle 10. If the smaller circle 11 is permitted to continue its rolling movement about the inside of the circle 10 back to its initial position, the point 12 will reverse direction along the line D and end up at its initial starting point. If the rotation or rolling movement of the inner circle 11 about the inside of the larger circle 10 is constant, the point 12 will describe a sinusoidal oscillation along the diameter of the larger circle 10 in the direction of the line D.

The foregoing principles may be utilized to generate a simple oscillatory or reciprocating harmonic motion. Thus in FIG. 2, there is disclosed a ring gear 13 with a smaller planetary gear 14 of a pitch diameter one-half the pitch diameter of the ring gear 13 positioned for rotation and revolving movement about the interior of the ring gear 13. A shaft 15 may be positioned in line with the pitch circle of the planetary gear 14 by a suitable lateral extension (not shown) and a roller 16 in turn mounted on the shaft 15. As the planetary gear 14 revolves about the interior of the ring gear 13, the shaft 15 and roller 16 will oscillate up and down as indicated by the double-headed arrow 17 in simple harmonic motion.

The foregoing is known in the prior art. However, it has an important application in the present invention since it enables the generation of a reciprocating simple harmonic motion by rotating parts only. By providing other rotating parts within equal and opposite inertias, dynamic balance is achieved and thus high-speed simple harmonic motion can be realized with a minimum of inertia problems normally encountered when a reversal in direction of a mechanical part takes place.

Figure 2:
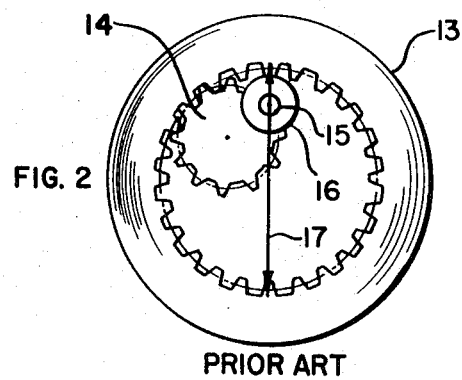
FIG. 2 illustrates schematically a practical embodiment of the control means of FIG. 1.
Figure 3:
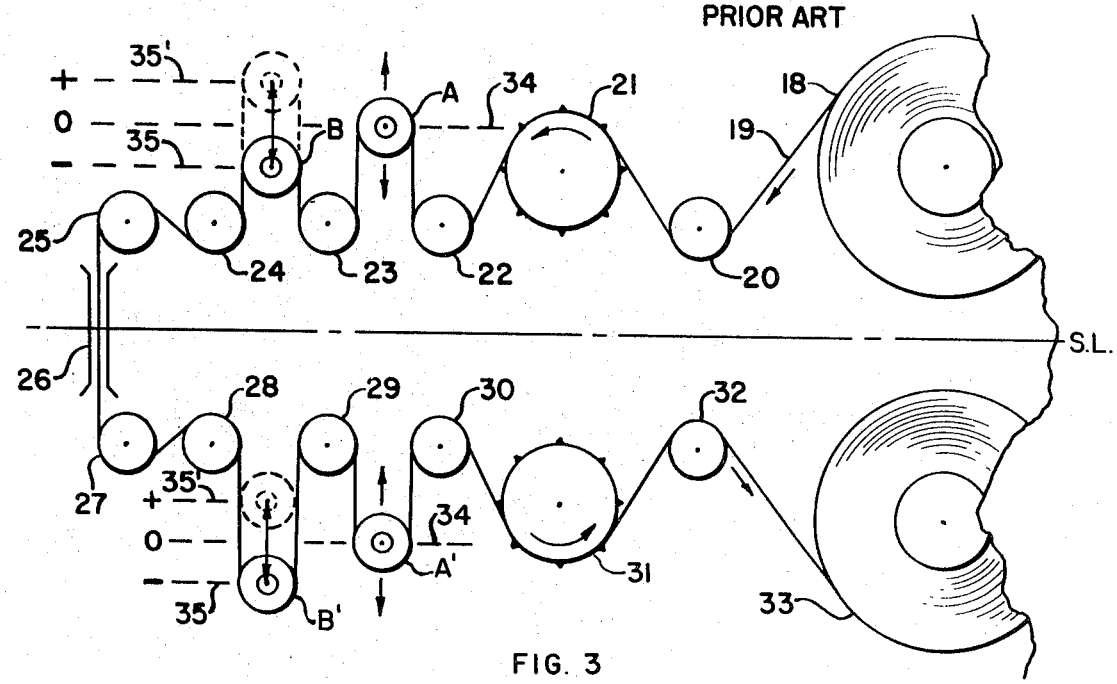
FIG. 3 schematically illustrates a first embodiment of the present invention for intermittently moving film wherein relatively large intermittent movements may be desired.

Referring now to FIG. 3, there is illustrated a first embodiment of the present invention utilizing the apparatus described in FIG. 2. This embodiment depicts schematically either a motion picture camera or a motion picture projector capable of operating at high speed, wherein the intermittent film movement through the film gate is effected without the use of free storage loops as are conventionally employed; that is, the film at all times is substantially unyieldingly captured or continuously under tension without reliance on resilient means.

As shown in FIG. 3, there is provided a payout film reel 18 from which film 19 passes over a fixed roller 20, constant speed film feeding sprocket wheel 21, and fixed roller 22. From the roller 22, the film passes over a first roller means including a movable roller A, thence down over a fixed roller 23 and thence up over a movable roller B and thence down and over a third fixed roller 24, fixed roller 25 to a film gate 26.

From the film gate 26, the film passes over fixed rollers 27 and 28 and thence about a second roller means including a movable roller B' fixed roller 29, movable roller A' and fixed roller 30. From the roller 30, the film then passes over a constant speed takeup sprocket wheel 31, about fixed roller 32 and to a takeup reel 33. A first film path of variable length is defined between the fixed roller 22 and the fixed rollers 24 and 25 feeding film into the film gate 26. A second film path of variable length in turn is defined between the fixed rollers 27 and 28 receiving film from the film gate 26 and the fixed roller 30. It will be evident that if the rollers A and B in this first path are deemed a first roller means which may be moved towards and away from a straight line S.L. between the payout and takeup portions and the film gate 26, the first path length defined may be increased or decreased. Similarly, if the rollers A' and B' are deemed a second roller means and are moved towards and away from the straight line S.L. the length of the second path may be varied.

In accord with the invention, the respective first and second path lengths are varied in unison in such a manner as to effect the desired intermittent film movement in the gate 26 even though the film is fed to the first path and taken up from the second path at a constant speed and even though the film is at all times held captive.

The foregoing variation of the path length while the film is at all times captured is effected by sinusoidally oscillating the first and second rollers towards and away from the straight line S.L. In the particular embodiment of FIG. 3, this sinusoidal oscillation is effected by the epicyclic gear structure described in FIG. 2 wherein the rollers, A, B, A', and B' may be mounted on shafts such as the shaft 15 for the roller 16 of FIG. 2, there being associated four epicyclic gear structures as shown in FIG. 2 for the four rollers respectively.

In accordance with an important feature of this invention, if A and B are considered a first pair of rollers and and a second pair of rollers in the first and second film paths, respectively, one of the rollers in the first pair is caused to oscillate in phase with one of the rollers in the second pair such as the rollers A and and the other roller in the first pair is similarly caused to oscillate in phase with the other roller in the second pair such as B and B' However, the rollers B and B' oscillate together 90° out of phase with the rollers A and A'.

Figure 4:
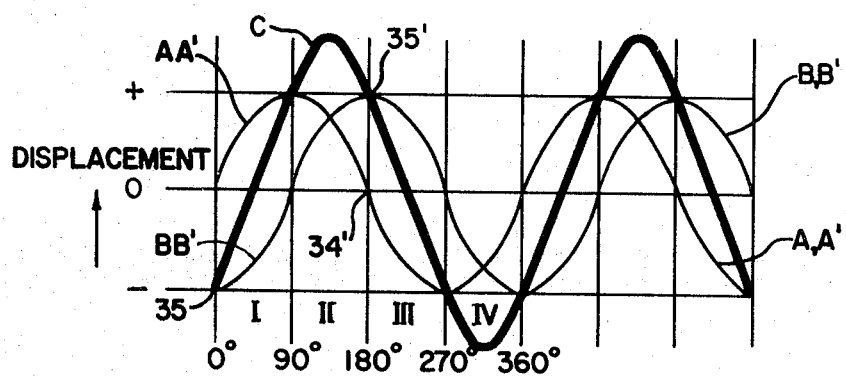
FIG. 4 illustrates displacement graphs useful in explaining the motion of certain components of the apparatus of FIG. 3.

The foregoing will become clearer by referring to the roller displacement graph of FIG. 4. As shown, the two rollers A and A' oscillate sinusoidally in accord with the displacement curve designated AA' in FIG. 4. The two rollers B and B' in turn oscillate 90° out of phase with the rollers A and A' as indicated by the sinusoidal curve BB' of FIG. 4. Thus, when the rollers A AND A' are at a center position on the zero axis as indicated at the point 34, the rollers B and B' will be at their lowermost positions as indicated at the point 35. The rollers in these positions in FIG. 3 are shown in solid lines.

One-half a cycle later in the oscillation, the rollers A and A' will be again at a mid or zero axis position as indicated at 34' in FIG. 4 while the rollers B and B' will be at the upper end points of oscillation as indicated at 35'. This latter position is illustrated in dotted lines for the rollers B and B' in FIG. 3.

The lengths of the first and second film paths are defined by the positions of the respective rollers and thus these lengths constitute a function of the sum of the sinusoidal curves AA' and BB' in FIG. 4. Addition of the curves results in a net displacement motion or variation in the film path length defined by the graph C shown by the heavy waveform in FIG. 4. If a complete cycle of operation is divided up into four successive periods I, II, III, and IV, the sum of the sine waves AA' and BB' during the first period I results in a substantially straight-line portion for the curve C. Similarly, the sum of these sine waves during the third period III also results in a substantially straight-line portion for the curve C. Accordingly, the first and second film length paths are increasing or decreasing at a substantially constant rate during the first and third periods shown in FIG. 4.

Figure 5:
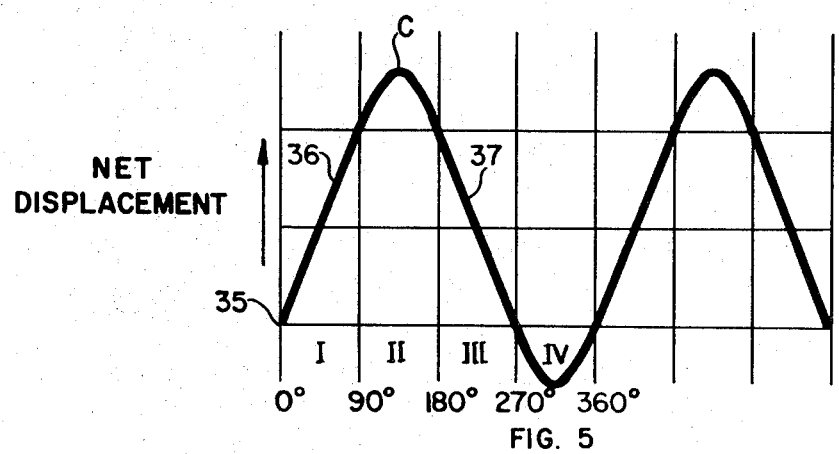
FIG. 5 is a repeat of a portion of the graph of FIG. 4.

Referring now to FIG. 5 there is shown a reproduction of the net displacement curve C wherein these straight-line portions are designated 36 and 37. The rate of change of displacement of these straight-line portions defines the speed at which the path length is increasing or decreasing. By making this speed exactly equal to the film payout and takeup speeds as determined by the sprocket rollers 21 and 31 of FIG. 3, the desired intermittent movement of film in the film gate 26 results.

Figure 6:
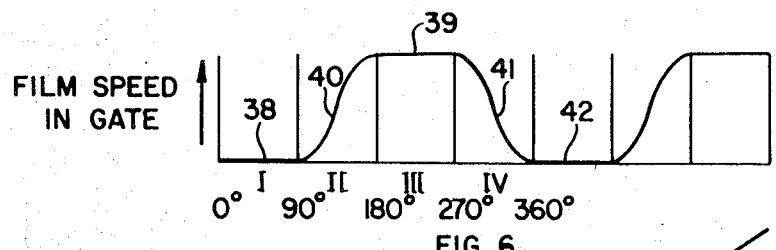
FIG. 6 is a plot of film speed in the film gate of the apparatus of FIG. 3 during successive periods of the cycle of operation.

FIG. 6 illustrates in graphic form the film speed in the film gate 26 of FIG. 3 during the respective periods I, II, III, and IV. Thus during the period I, the film speed in the gate is zero; that is, the film is stationary. This is because the upper path length is increasing at a rate as indicated by the line 36 in FIG. 5 corresponding to the payout rate of film by the sprocket wheel 21 and thus all the film payed out is being taken up by the change in the first path length. Simultaneously, since the rollers A' and B' move in phase with the rollers A and B, the second path length for film received from the gate 26 will be decreasing at a constant rate corresponding to the takeup speed by the sprocket wheel 31 of FIG. 3. Therefore, the film must necessarily be stationary in the gate 26. Thus, it will be evident that the film may at all times be captive even though the portion of film in the film gate 26 is stationary.

Still referring to FIG. 6, it will be noted that a maximum film speed in the gate occurs during the third period as indicated at 39. This maximum speed results when the first path length is decreasing at a constant rate as depicted by the portion 37 of the curve C of FIG. 5 and the second path length is correspondingly and simultaneously increasing at the same rate. Since the film during this time is also being fed at a constant speed from the payout sprocket 21 and taken up at the same speed by the takeup sprocket 31, the film speed as depicted at 39 in FIG. 6 during this third period is twice the particular speed at which film is payed out and taken up. This relationship is necessary in order that the film remain under tension or be captive at all times.

Acceleration of the film from its stationary position in the film gate during the period I to its maximum speed during the period III of FIG. 6 is depicted at 40 and deceleration of the film from its maximum speed 39 to its stationary position at which the next film frame is positioned is depicted by the portion 41.

It should be noted in FIG. 6 that the acceleration and deceleration of the film in the film gate during the periods II and IV respectively, takes place smoothly. Essentially, these portions of the curve of FIG. 6 correspond to the integrals of the displacement reversal of the curve C occurring during the periods II and IV of FIG. 5.

Figure 7:
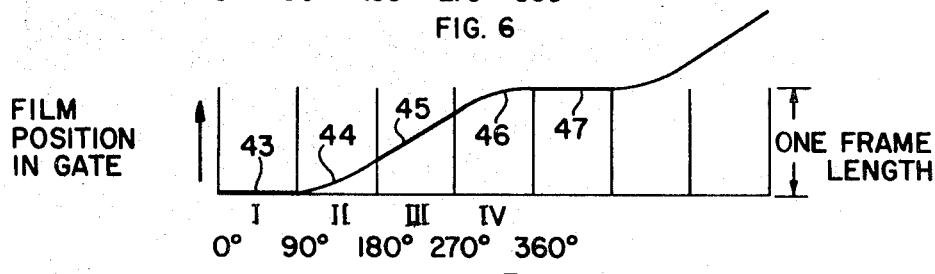
FIG. 7 is a plot of film position in the film gate during successive periods of a cycle of operation; and, FIG. 8 illustrates a second embodiment of the invention utilizing a modified type of control means.

FIG. 7 illustrates graphically the film position in the film gate. In essence, the curve of FIG. 7 represents the integral of the curve of FIG. 6. Thus during the first period I the film is in a given position 43 in the film gate. During the second period, the film gradually becomes displaced by accelerating towards a constant speed. This constant speed of displacement is indicated by the portion 45 during the third period. Thence, the rate of film displacement begins to slow down during the fourth period as indicated at 46 to come to rest at the next frame as indicated at 47.

Looking at the relationships in another way, the film speed diagram of FIG. 6 represents the differentiation of the film position or displacement diagram of FIG. 7. Thus taking the rate of change of the curve of FIG. 7 during the successive periods and plotting this rate of change, there will result the curve of FIG. 6.

Considering the foregoing in still another aspect, assume for a moment that the rollers are moving, but the film payout and takeup sprockets are stationary. Then, with reference to FIG. 5, for the first half of period II, film is stored by rollers A and B at a sinusoidally diminishing rate, and payed out at an equally changing rate by rollers A' and B'. This rate reaches zero at the half point of period II, whereupon it is reversed and rollers A and B begin paying out film at an increasing rate, while rollers A' and B' begin storing film at an equally increasing rate, until the rates reach their maximum at the end of period II. Thus, during period II film was moved backward, and then forward again, by precisely equal amounts.

With these relationships in mind, assume now that the sprocket wheels are turning at a constant speed. As described heretofore, during period I, rollers A and B store film at the same rate as the sprocket wheel feeds it. As this storing rate is gradually reduced during period II, the feed rate of the film overtakes it. At the same time, rollers A' and B' are gradually paying out less film, so that the constant speed takeup sprocket begins making up the shortage by pulling film out of the gate. At the halfway point of period II, the film in the gate has been accelerated to exactly the speed of the linear payout and takeup rate by the sprockets. At this instant, the two roller pairs contribute to no speed change. From that moment on, as indicated by the reversal of curve C, the rollers begin adding their acceleration to the film payout and takeup speed, until at the end of period II the rollers move film at the same speed and in the same direction as the sprockets. Therefore, during period III, film in the gate must move at twice the payout and takeup speed, since the two equal rates are added.

In the embodiment described with respect to FIGS. 3 through 7, the actual motion depicted of the rollers is somewhat exaggerated in the event the film is to move only one short film frame at a time. In an actual embodiment, the amplitude of oscillation of the rollers in this case would be considerably smaller. However, there may be instances in which it might be desirable to move a long film frame or a number of film frames at a time, in which case the amplitudes of the roller oscillations may readily be adjusted by simply changing the size of the control means in the form of the epicyclic gears described in FIG. 2 and a matching adjustment made in the payout and takeup sprocket wheel speed.

In those instances wherein the intermittent movement is only over the length of one short film frame, it is possible to simplify the structure somewhat by employing eccentric wheels to effectively result in the desired harmonic motion of the rollers rather than the epicyclic gear arrangement described in conjunction with FIGS. 2 and 3.

Figure 8:
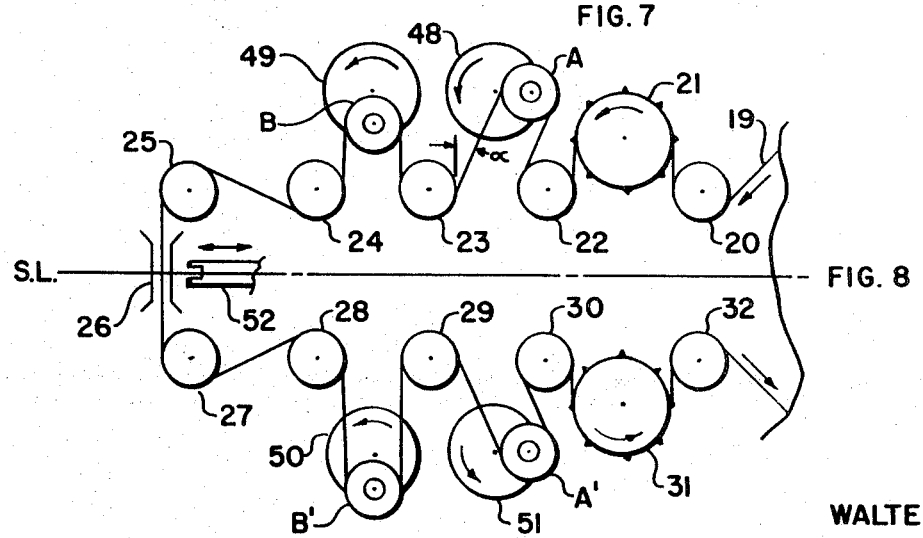

Thus, referring to FIG. 8 there is illustrated a modified type of control means for the rollers. In this figure, all of the various components making up the structure may be identical with those shown in FIG. 3 except for the control means for effecting oscillating movement of the rollers. Accordingly, the same numerals have been employed as described in FIG. 3 for the various sprocket wheels, fixed rollers, movable rollers, and film gate. However, rather than the epicyclic gear arrangement of FIG. 2, there are provided wheels 48, 49, 50, and 51 positioned to rotate about fixed central axes. On each of these wheels there are provided eccentric shafts upon which the rollers A, B, B', and A' are respectively mounted. The eccentric mounting is such that the rollers A and A' are in phase with each other and the rollers B and B' are in phase with each other. However, the rollers A and A' are displaced 90° from the rollers B and B'.

If all of the wheels 48, 49, 50, and 51 are now rotated in counterclockwise directions in unison at constant speeds, the vertical component of motion of the rollers will be sinusoidal exactly the same as for the embodiment of FIG. 3 except that the amplitude of oscillation will be less as determined by the degree of eccentric mounting of the shafts. There will, however, be introduced a slight error as a consequence of the eccentric mounting which results in sidewise movement of the rollers. This sidewise movement results in generation of the angle α as depicted for the film portion passing between the roller A and fixed roller 23 relative to the vertical. It will be evident, however, that the path length of the film between the roller A and fixed roller 23 when in the position shown in FIG. 8 differs by a very small amount from the path length that would result if the roller A were in the center position of a straight-line up and down motion. This difference is proportional to $1 - \cos\alpha$. When the angle $\alpha$ is small, the cosine of this angle approaches one and thus the error approaches zero. The angle $\alpha$ can be made fairly small by increasing the ratio of the film path between the roller A and fixed roller 23 and the distance of the shaft from the center of the wheel 48. Actually, the error is even further reduced as a consequence of the compensation resulting from the other roller B which is 90° out of phase with the roller A so that the sum of the harmonic motions as described in FIG. 4 again results in a substantially straight-line relationship during the first and third periods.

In the embodiment of FIG. 8, there is shown close to the film gate 26 a registration pin structure 52 which may be caused to enter perforations in the film during the first period when the film is stationary in the gate. This added refinement will simply assure accurate registration of each film frame in the gate during its motionless period and constitutes a further refinement to the apparatus although not essential to the invention. In this respect, it should be noted that the registration pin structure 52 in no sense functions as a pulldown claw but merely is caused to reciprocate back and forth as shown by the double-headed arrow to increase indexing accuracy.

OPERATION

The overall operation of the apparatus will be evident from the foregoing. As described, a cycle of operation may be divided into the four periods designated in FIGS. 4, 5, 6, and 7 as I, II, III, and IV. Where sinusoidal operation of the rollers relative to the line S.L. is effected, with a payout and takeup sprocket wheel speed properly matched, and the first roller means A and B in phase with the second roller means A' and B', then, with reference to either FIG. 3 or 8, the following occurs: The net displacement of the rollers A and B away from the straight line S.L. takes place simultaneously and at the same rate as the net displacement of the second rollers A' and B' towards the straight line S.L. Therefore, the movement of the film in the film gate will be as depicted in FIGS. 6 and 7, the periods I, II, III, and IV all being of equal duration.

Thus, during one complete cycle, the film will be stationary for one-fourth of the overall cycle as indicated by the period I, the film will then accelerate during the period II towards a constant rate of movement or speed. This constant rate or speed will be maintained constant during the period III, and the film will then be decelerated to a stationary position during the period IV. Any camera or projector utilizing the intermittent film movement of the invention would thus have the shutter operate to expose the film only during one-fourth of the cycle of film movement; that is, during the period I when the film is stationary in the film gate.

It should be noted, in FIGS. 3 and 8, that each roller moves film twice the length of its displacement and that the action of the two rollers is added in each film path. Furthermore, the rollers perform the storing action during one-fourth cycle, thus storing only one-fourth frame. Therefore, their travel distance during this one-fourth cycle, or one-half their excursion, is ½×½×¼ frame length, or one-sixteenth of a frame length. This defines the half-amplitude of oscillations of the rollers in FIG. 3 or the eccentric displacement of the rollers relative to the centers of rotation of the wheels in FIG. 8. The very small eccentricity compared with frame length greatly helps to keep the angle $\alpha$ small in the embodiment of FIG. 8 and minimize any error due to lateral displacement.

Just as the length of film transported during one cycle in the embodiment of FIG. 3 can be adjusted by selection of the size of the epicyclic gears shown in FIG. 2, so it can be adjusted in the embodiment of FIG. 8 by selecting the eccentricity distance of the rollers A, B, A', and B'. In both embodiments, the speed of the sprocket wheels has to be matched.

As a consequence of the novel structural arrangement providing for increasing and decreasing the film paths to and from the gate and vice versa in the manner shown, the necessity of pulldown claw arrangements, intermittent sprockets, and/or storage loops is wholly eliminated. These features combined with the characteristics of dynamically balanced mechanisms result in the advantage that film may be intermittently moved at high speed with a minimum of wear and vibration of both film and mechanism.

While only two particular embodiments have been shown and described, other means for varying the film path lengths while holding the film captured falling within the scope and spirit of this invention will occur to those skilled in the art. Further, the orientation of the means need not be as depicted in the particular embodiments disclosed. For example, the rollers need not move relative to a single reference line such as shown at S.L. but could each independently move in various directions relative to differently oriented individual reference lines and/or in different planes.

Finally, while the invention has been described with respect to motion picture cameras or projectors, it is clearly applicable to printers, viewers, recorders, readout devices and other devices requiring intermittent movement of a film, tape, data strip or equivalent medium.

The intermittent film movement apparatus is therefore not to be thought of as limited to the particular embodiments disclosed merely for illustrative purposes.

What is claimed is:

1. An apparatus for intermittently moving film through a film gate wherein said film is always substantially unyieldingy captive and is payed out by a payout means to said film gate at a constant speed and taken up by a takeup means from said film gate at the same constant speed, and wherein a portion of film in said film gate is subject to a cycle in which it is stationary for a first given period, smoothly accelerated to a given speed for a second given period, maintained at said given speed for a third given period, and smoothly decelerated to a stationary condition during a fourth given period, said cycle thence being repeated, said apparatus including: first movable roller means about which a first length of film between said payout means and film gate passes; second movable roller means about which a second length of film between said film gate and takeup means passes; and control means connected to said first and second roller means for periodically moving them so that said first length of film is increased when said second length of film is decreased, and so that said first length of film is decreased when said second length of film is increased, the total of said first and second lengths of film always remaining constant, said control means including associated epicyclic gear trains, each comprising a ring gear having internal teeth and a smaller planetary gear with external teeth meshing with said internal teeth for rotation and revolving movement about the interior of said ring gear, said planetary gear having a pitch diameter one-half the pitch diameter of said ring gear and including a shaft on its pitch circle extending normally from the plane of revolution; and means coupling said shaft to an associated roller means so that movement of said roller means is oscillatory in a substantially straight line with a speed which varies sinusoidally when said planetary gear is revolving in the interior of said ring gear at a constant speed.

2. An apparatus for intermittently moving film through a film gate wherein said film is always substantially unyieldingy captive and is payed out by a payout means to said film gate at a constant speed and taken up by a takeup means from said film gate at the same constant speed, and wherein a portion of film in said film gate is subject to a cycle in which it is stationary for a first given period, smoothly accelerated to a given speed for a second given period, maintained at said given speed for a third given period, and smoothly decelerated to a stationary condition during a fourth given period, said cycle thence being repeated, said apparatus including: first movable roller means about which a first length of film between said payout means and film gate passes; second movable roller means about which a second length of film between said film gate and takeup means passes; and control means connected to said first and second roller means for periodically moving them so that said first length of film is increased when said second length of film is decreased, and so that said first length of film is decreased when said second length of film is increased, the total of said first and second lengths of film always remaining constant, said control including associated wheels mounted for rotation about stationary axes, each wheel having an eccentrically disposed shaft extending normally from the plane of rotation of said wheel; and a roller rotatably mounted on said shaft, said roller constituting a roller in the associated roller means so that a component of movement of said roller is sinusoidal when said wheel rotates on its axis.

3. An apparatus for intermittently moving film through a film gate wherein said film is always substantially unyieldingly captive and is payed out by a payout means to said film gate at a constant speed and taken up by a takeup means from said film gate at the same constant speed, and wherein a portion of film in said film gate is subject to a cycle in which it is stationary for a first given period, smoothly accelerated to a given speed for a second given period, maintained at said given speed for a third given period, and smoothly decelerated to a stationary condition during a fourth given period, said cycle thence being repeated, said apparatus including: first movable roller means about which a first length of film between said payout means and film gate passes; second movable roller means about which a second length of film between said film gate and takeup means passes; and control means connected to said first and second roller means for periodically moving them so that said first length of film is increased when said second length of film is decreased, and so that said first length of film is decreased when said second length of film is increased, the total of said first and second lengths of film always remaining constant, said first and second roller means including first and second pairs of rollers, respectively, one of the rollers in the first pair moving in phase with one of the rollers in the second pair and the other roller in the first pair moving in phase with the other roller in the second pair but 90° out of phase with the first-mentioned rollers; first and second sets of fixed rollers associated with said first and second roller means to guide film in various directions to pass over one moving roller in each pair and over to the other moving roller in each pair, whereby the rate at which said first and second film portions change length is determined by the sum of the oscillatory motions of the rollers in each pair.